United States Patent
Gehrmann (10) Patent No.: US 8,015,378 B2
(45) Date of Patent: Sep. 6, 2011

(54) UPDATING MEMORY CONTENTS OF A PROCESSING DEVICE

(75) Inventor: Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 840 days.

(21) Appl. No.: 11/813,480

(22) PCT Filed: Dec. 20, 2005

(86) PCT No.: PCT/EP2005/013929
§ 371 (c)(1),
(2), (4) Date: Sep. 7, 2007

(87) PCT Pub. No.: WO2006/072410
PCT Pub. Date: Jul. 13, 2006

(65) Prior Publication Data
US 2008/0222368 A1  Sep. 11, 2008

(30) Foreign Application Priority Data
Jan. 7, 2005  (EP) .................................... 05388002

(51) Int. Cl.
*G06F 13/10* (2006.01)
(52) U.S. Cl. ...................................................... 711/163
(58) Field of Classification Search .................. None
See application file for complete search history.

(56) References Cited

U.S. PATENT DOCUMENTS

| | | | | |
|---|---|---|---|---|
| 5,581,790 A * | 12/1996 | Sefidvash | ..................... | 710/34 |
| 6,295,604 B1 * | 9/2001 | Callum | ..................... | 713/160 |
| 6,381,741 B1 * | 4/2002 | Shaw | ..................... | 717/168 |
| 2002/0069316 A1 * | 6/2002 | Mattison | ..................... | 711/103 |
| 2005/0257205 A1 * | 11/2005 | Costea et al. | ..................... | 717/168 |

FOREIGN PATENT DOCUMENTS
WO   WO 03/060673 A1   7/2003

OTHER PUBLICATIONS

Lic, David et al. "Specifying and Verifying Hardware for Tamper-Resistant Software," Proceedings of the 2003 IEEE Symposium on Security and Privacy, 12 pp. BNSDOCID—XP 107639720A1.

* cited by examiner

*Primary Examiner* — Duc T Doan (57) ABSTRACT

A method of updating memory content stored in a memory of a processing device, the memory comprising a plurality of addressable memory blocks, the memory content being protected by a current integrity protection data item stored in the processing device, the method comprising determining a first subset of memory blocks that require an update, and a second subset of memory blocks that remain unchanged by said updating; calculating, as parallel processes, a first and a second integrity protection data item over the memory blocks; wherein the first integrity protection data item is calculated over the current memory contents of the first and second subsets of memory blocks; and wherein the second integrity protection data item is calculated over the current memory contents of the second subset of memory blocks and the updated memory block contents of the first subset of memory blocks.

25 Claims, 5 Drawing Sheets

UPDATING MEMORY CONTENTS OF A PROCESSING DEVICE

Disclosed is a method, product means, and a device for updating memory contents of a processing device.

Embedded systems like mobile phones and other data processing devices depend on the execution of correct software that has not been manipulated in an unauthorised way. Manipulation of the software might lead to incorrect behaviour of the device or even a breaking of the fundamental security features of the device. Hence, it is particularly important to protect the software of the device. This can for example be achieved by storing the program into a protected memory. The memory can either be physically protected from illegal access or protected by cryptographic methods. In practice it is hard or expensive to produce memory with good physical protection and especially to protect the memory interfaces. Consequently, the most attractive solution is to use some type of cryptographic protection of the software stored in the memory.

Furthermore, software even for rather small systems becomes increasingly complex, thereby increasing the risk of errors and unintended features, especially in early releases during a software life cycle. Furthermore, the functionality of early software releases is typically limited. Consequently, there is an increasing need for frequent updates of the software stored in embedded devices.

The need for frequent updates and the desire to provide sufficient protection for the software of a data processing device create a need for security solutions that protect the software of a data processing device at storage and that allow for secure software upgrades.

U.S. Pat. No. 6,026,293 discloses a method for preventing electronic memory tampering in an electronic device. According to this prior art method, when the electronic device is to be reprogrammed by a data transfer device, the electronic device initiates a public/private key based challenge-response authentication scheme to authenticate the data transfer device. Once authenticated, the data transfer device is permitted access to reprogram the memory. Following the reprogramming of the memory, the electronic device performs a hash calculation of the modified memory contents. The calculated hash value is sent to the data transfer device for a digital signature, and the signed hash value is returned to the electronic device for storage. The signed hash value is subsequently used for auditing the integrity of the memory content, e.g. during boot-up or periodically.

Even though the above prior art method provides both authentication protection during the loading stage and integrity protection of the memory contents of the electronic device, it remains a problem to improve the security of the integrity protection mechanism.

The above and other problems are solved by a method of updating at least a part of a memory content stored in a memory of a processing device, the memory comprising a plurality of addressable memory blocks, the memory content being protected by a current integrity protection data item stored in the processing device, the method comprising determining a first subset of said plurality of memory blocks that require an update from respective current memory block contents to respective updated memory block contents, and a second subset of the plurality of memory blocks having stored therein respective current memory contents that remain unchanged by said updating;

calculating a first and a second integrity protection data item over the plurality of memory blocks; wherein the first integrity protection data item is calculated over the current memory contents of the first and second subsets of memory blocks; wherein the second integrity protection data item is calculated over the current memory contents of the second subset of memory blocks and the updated memory block contents of the first subset of memory blocks; and wherein calculating the first and the second integrity protection data items is performed as parallel processes;

updating the memory content of said first subset of memory blocks.

It is an advantage of the method described herein that it reduces the risk for a hostile user to interrupt the update process, e.g. after a rewrite of the memory and before a recalculation of the reference integrity protection data item. Hence, it is an advantage of the method described herein that it ensures that the new integrity protection data item is calculated over the correct memory image.

The method described herein provides a robust and secure update process for the software and/or other data of a processing device, such as the over-the-air update of mobile telephones. It is a further advantage of the method described herein that it does not rely on an external update server to sign the entire updated software image. This is a particular advantage in connection with so-called delta updates and/or in situations when only a part of the current memory is updated and the update server, or another entity that generates the software update package, does not know the entire current memory contents of the processing device. Delta updates include differences of the new (updated) software relative to the current software, thereby reducing the size of the upgrade packet. In some delta-file techniques, the update file also includes commands to control the generation of the updated software version from the current software and the received update. Delta-file techniques as such are known in the art and described in e.g. "Delta storage for arbitrary non-text files", by Christian Reichenberger, Proc. Of the 3rd International Workshop on Software Configuration Management, pp. 144-152, Norway, June 1991. In particular, due to bandwidth limitations, delta updates are particularly interesting in connection with over-the-air (OTA) updates. It is an advantage of the method described herein that it provides an efficient security mechanism that can also be applied to delta updates.

The updating step generally includes replacing the current memory block content of at least the first subset of memory blocks with the respective updated memory block contents. The updated memory contents may be received, e.g. from an update server, or determined from e.g. a received update file/package such as a delta file as described herein.

The term integrity protection data item is intended to comprise any data item generated by a mechanism for assuring that information stored in the memory is not accidentally or maliciously altered or destroyed. Examples of integrity protection mechanisms include message authentication codes, one-way hash functions, and digital signatures. When the integrity mechanism is a cryptographic integrity protection mechanism based on a secret key, the security of the integrity protection is increased. When the integrity protection data item is a message authentication code, a particularly secure and efficient integrity protection is achieved.

Message authentication codes (MAC) are a known mechanism for integrity protecting data. A MAC is a function that takes a variable length input and a key to produce a fixed-length integrity protection data item as an output, the so-called MAC value or tag value. MACs are typically used between two parties that share a secret key in order to validate information transmitted between these parties. In some embodiments, a MAC is calculated by applying a one-way hash function to the data and encrypting the result using a secret key. Examples of suitable MAC functions that can be combined with a cryptographic hash function include HMAC (Keyed-Hashing for Message Authentication), Cipher Block Chaining (CBC) MAC using for example AES or a secure one-way hash function. In the method described herein, a message authentication code is used to check the integrity of data stored in the memory of the processing device, i.e. in this situation the MAC is used by only one party, i.e. the data processing device, e.g. periodically, when storing and/or retrieving the data, and/or in response to other events such as during start-up. It is understood that the calculation of each of the first and second integrity protection data items may include calculation of a single MAC or the calculation of a plurality of MACs. The first and second integrity protection data items may be calculated based on the same or different algorithms and based on the same or different secret keys.

Consequently, in some embodiments, the integrity protecting comprises storing the calculated reference integrity protection data item, e.g. a message authentication code value, in relation to the memory content to be protected, thereby making it available for subsequent memory audits of the memory content by the data processing device. Hence, when auditing the memory content, the device calculates the integrity protection data item of the stored data using the secret key stored in the device, and compares the result with the previously stored reference data item, e.g. reference MAC value. Consequently, in this embodiment, the secret key need only be known to the digital processing device. In some embodiments, the secret key is a secret data item unique to the data processing device, e.g. a secret data item known only to the data processing device.

In one embodiment, the method further comprises
 comparing the first integrity protection data item with the current integrity protection data item; and
 if the first integrity protection data item and the current integrity protection data item correspond to each other, storing the second integrity protection data item and updating the first subset of memory blocks with the respective updated memory block contents;
 performing an integrity check of the updated memory content based on the stored second integrity protection data item.

Consequently, any attempt to interrupt the update process during the actual re-flash of the memory is detected in the final integrity check, thereby assuring the security of the whole process.

In one embodiment, performing the integrity check comprises calculating an audit integrity protection data item of the updated memory after updating the first subset of memory blocks with the respective updated memory block contents; and comparing the calculated audit integrity protection data item with the stored second integrity protection data item. Subsequently, such an audit may be performed during the boot process of the mobile terminal and/or each time the software is to be executed and/or periodically in predetermined time intervals.

Since the first and second integrity protection data items are calculated in parallel processes, it is ensured that the integrity protection data items are calculated using the same current memory block contents, thereby ensuring that any attempt to replace the memory content during the update process can be detected by a subsequent verification of the calculated integrity protection data items.

In one embodiment, calculating the first and the second integrity protection data items as parallel processes includes initiating calculating the first and the second integrity protection data items prior to completing calculation of any one of the first and second integrity protection data items. Hence, the risk of a dishonest user interrupting the update process and replacing the current memory content between the calculation of the first and second integrity protection data items is eliminated.

In a further embodiment, calculating each of the first and second integrity protection data items comprises performing a corresponding iterative process including a number of iterations; wherein each iteration includes processing one or more of said plurality of memory blocks; and wherein each iteration is performed for the calculation of the first and the second integrity protection data items prior to processing a subsequent iteration. Hence, it is ensured that the same version of said one or more plurality of memory blocks are used in both calculation processes, thereby further increasing the security of the update process.

In a yet further embodiment, calculating the first and the second integrity protection data items as parallel processes includes sequentially processing the plurality of memory blocks such that each memory block is processed for the calculation of the first and the second integrity protection data items prior to processing a subsequent memory block. Hence, it is ensured that no memory block is replaced by a dishonest user between the calculations of the integrity protection data items.

In one embodiment, the method comprises
 a) obtaining the current memory block content of a first memory block;
 b) processing the obtained current memory block content for the calculation of the first integrity protection data item;
 c) if the first subset of memory blocks includes the first memory block, then obtaining and processing the updated memory content of the first memory block for the calculation of the second integrity protection data item; otherwise processing the obtained current memory block content of the first memory block for the calculation of the second integrity protection data item;
 d) performing items a) through c) for all memory blocks.

In one embodiment, the memory is a flash memory. Flash memory (sometimes also called "flash RAM") is a type of non-volatile memory that can be erased and reprogrammed in units of memory called blocks, each block comprising a plurality of bytes. When data needs to be changed (rewritten) in flash memory, the flash memory can be written to in block (rather than byte) sizes.

In yet another embodiment, the method further comprises receiving a data item comprising said updated memory block contents. The data item may comprise a delta-file or delta-update package of a delta-update process. Alternatively, the data item may comprise the entire software image of one or more software applications, configuration data, payload data, and/or the like that need(s) to be updated. The data item may be received from an external data processing system, such as a loading station, a software update server, etc. and via any suitable communications medium, e.g. a wired or wireless communications link. Examples of wired communications links include serial communications link, such as USB, FireWire, LAN, etc. Examples of wireless communications links include short-range wireless communications links, such as infrared links, e.g. IrDa, short-range radio-frequency links, such as Bluetooth, wireless LAN, etc. In one embodiment, the data item is received over-the-air via a telecommunications network, such as a cellular telecommunications network.

When receiving the data item comprises verifying the data item by applying a cryptographic authentication process, the authenticity and/or integrity of the received data item is ensured, thereby increasing the security of the update process. In one embodiment, the cryptographic authentication process includes digitally signing the data item according to a public key cryptosystem. The digital signing of software is an efficient and secure mechanism for the verification of software loaded into a mobile device. Successful verification of the signature guarantees that the software has been issued by a legitimate source. Furthermore, digital signatures based on public key techniques have the advantage that the public key used for verification does not need to be confidentiality protected at transfer or storage. Hence, the same public key can be installed in a large number of devices without compromising security. This allows efficient procedures for fast and secure software upgrade.

When the data item comprises a digital certificate verifying the authenticity of the digital signature, the security of the update process is further increased. It is understood that the data processing device may receive more than one digital certificate forming a certificate chain, wherein one certificate of the chain is verified by a public root key stored in the data processing device.

In one embodiment, receiving the data item comprises receiving a digital signature calculated over the updated memory blocks; and determining a first subset of said plurality of memory blocks that require an update further comprises verifying the digital signature of the updated memory blocks.

When the calculation of the first and second integrity protection data items is performed by trusted program code, the security of the process is increased. Here the term trusted program code is intended to include any integrity-protected program code, such as program code included in the firmware of the processing device, code that is cryptographically integrity checked prior to its execution, program code that is included in the boot ROM code of the processing device, or the like.

In some embodiments, at least some of the following steps are performed by the trusted program code in addition to the calculation of the first and second integrity protection data items: The determining of the first and second subsets of memory blocks, the comparing of the first integrity protection data item with the current integrity protection data item, the storing of the second integrity protection data item, the updating of the first subset of memory blocks, and the integrity check of the updated memory content based on the stored second integrity protection data item.

The calculation of the first and second integrity protection data items is performed by a hardware implementation of a message authentication code thereby providing a particularly efficient and secure update process. When the integrity protection data items are message authentication codes constructed based on a block cipher or one-way hash function, a particularly efficient hardware implementation can be provided.

In a further embodiment, calculating the first and second integrity protection data items comprises
providing a message authentication calculation module adapted to implement an iterative message authentication code calculation process including a sequence of iterations, wherein each iteration includes updating a set of state variables;
providing first and second sets of registers for storing respective first and second sets of state variables; and
causing the message authentication calculation module to alternately perform iterations of the calculation of the first and second integrity protection data item and to alternately update the first and second sets of registers.

Hence, in particular in connection with a hardware implementation, a very compact implementation is provided, since only one MAC calculation module is required. Furthermore, since this embodiment ensures an efficient and parallel calculation of the two MACs, a fast and secure update process is provided.

The present invention relates to different aspects including the method described above and in the following, corresponding devices, and computer programs, each yielding one or more of the benefits and advantages described in connection with the above-mentioned method, and each having one or more embodiments corresponding to the embodiments described in connection with the above-mentioned method.

More specifically, according to another aspect, a data processing device comprises a memory for storing a memory content, the memory comprising a plurality of addressable memory blocks, the memory content being protected by a current integrity protection data item stored in the processing device; processing means adapted to
  determine a first subset of said plurality of memory blocks that require an update from respective current memory block contents to respective updated memory block contents during an update of at least a part of the memory content, and a second subset of the plurality of memory blocks having stored therein respective current memory contents that remain unchanged by said updating;
  calculate a first and a second integrity protection data item over the plurality of memory blocks; wherein the first integrity protection data item is calculated over the current memory contents of the first and second subsets of memory blocks; wherein the second integrity protection data item is calculated over the current memory contents of the second subset of memory blocks and the updated memory block contents of the first subset of memory blocks; and wherein calculating the first and the second integrity protection data items is performed as parallel processes.

In one embodiment, the processing means is further adapted to
  compare the first integrity protection data item with the current integrity protection data item; and
  if the first integrity protection data item and the current integrity protection data item correspond to each other, to store the second integrity protection data item and to update the first subset of memory blocks with the respective updated memory block contents;
  perform an integrity check of the updated memory content based on the stored second integrity protection data item.

Consequently, any attempt to interrupt the update process during the actual re-flash of the memory is detected in the final integrity check, thereby assuring the security of the whole process.

In one embodiment, the processing means is further adapted to perform the integrity check by calculating an audit integrity protection data item of the updated memory after updating the first subset of memory blocks with the respective updated memory block contents, and by comparing the calculated audit integrity protection data item with the stored second integrity protection data item.

In one embodiment, the processing means is further adapted to initiate calculating the first and the second integrity protection data items prior to completing calculation of any one of the first and second integrity protection data items. Hence, the risk of a dishonest user interrupting the update process and replacing the current memory content between the calculation of the first and second integrity protection data items is eliminated.

In a further embodiment, the processing means is further adapted to calculate each of the first and second integrity protection data items by performing a corresponding iterative process including a number of iterations; wherein each iteration includes processing one or more of said plurality of memory blocks; and wherein each iteration is performed for the calculation of the first and the second integrity protection data items prior to processing a subsequent iteration. Hence, it is ensured that the same version of said one or more plurality of memory blocks are used in both calculation processes, thereby further increasing the security of the update process.

In a yet further embodiment, the processing means is further adapted to sequentially process the plurality of memory blocks such that each memory block is processed for the calculation of the first and the second integrity protection data items prior to processing a subsequent memory block. Hence, it is ensured that no memory block is replaced by a dishonest user between the calculations of the integrity protection data items.

In one embodiment, the processing means is further adapted to
a) obtain the current memory block content of a first memory block;
b) process the obtained current memory block content for the calculation of the first integrity protection data item;
c) if the first subset of memory blocks includes the first memory block, then to obtain and process the updated memory content of the first memory block for the calculation of the second integrity protection data item; otherwise to process the obtained current memory block content of the first memory block for the calculation of the second integrity protection data item;
d) perform items a) through c) for all memory blocks.

In one embodiment, the processing device is a mobile terminal.

In one embodiment, the memory is a flash memory.

In one embodiment, the device further comprises means for receiving a data item comprising said updated memory block contents.

In one embodiment, said data item is protected by a digital signature; and the processing means is further adapted to verify said digital signature.

In one embodiment, the data item comprises a delta-update package.

In one embodiment, the processing means comprises a hardware module for implementation of a message authentication code.

In one embodiment, the processing means comprises
a message authentication calculation module adapted to implement an iterative message authentication code calculation process including a sequence of iterations, wherein each iteration includes updating a set of state variables; and
first and second sets of registers for storing respective first and second sets of state variables; and
the processing means is adapted to cause the message authentication calculation module to alternately perform iterations of the calculation of the first and second integrity protection data item and to alternately update the first and second sets of registers.

The term data processing device is intended to comprise any electronic device comprising a data memory on which data can be loaded from an external source, e.g. from a data transfer system. In particular, the term data processing device is intended to comprise any electronic equipment, portable radio communications equipment, and other handheld or portable devices. The term portable radio communications equipment includes all equipment such as mobile terminals, e.g. mobile telephones, pagers, communicators, electronic organisers, smart phones, personal digital assistants (PDAs), handheld computers, or the like.

The term memory content is intended to include any data stored in the memory of the data processing device. In particular, the term memory content is intended to include but not restricted to configuration data, program code, e.g. platform software or application software intended for execution by the device, or the like. In particular, the term memory content is intended to include the memory content of a mobile terminal that is integrity protected by an integrity protection mechanism such as a message authentication code. Hence, this may include the entire contents of a memory of the mobile terminal or only a predetermined part of the memory contents. The term memory block is intended to include memory blocks/segments of a predetermined size of any suitable segmentation of the memory. In one embodiment, the memory blocks correspond to the blocks of a flash memory.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described above and in the following, when said computer program is run on the data processing device.

For example, the program code means may be loaded in a memory, such as a RAM (Random Access Memory), from a storage medium or from another computer via a computer network. Alternatively, the described features may be implemented by hardwired circuitry instead of software or in combination with software.

Figure 1:
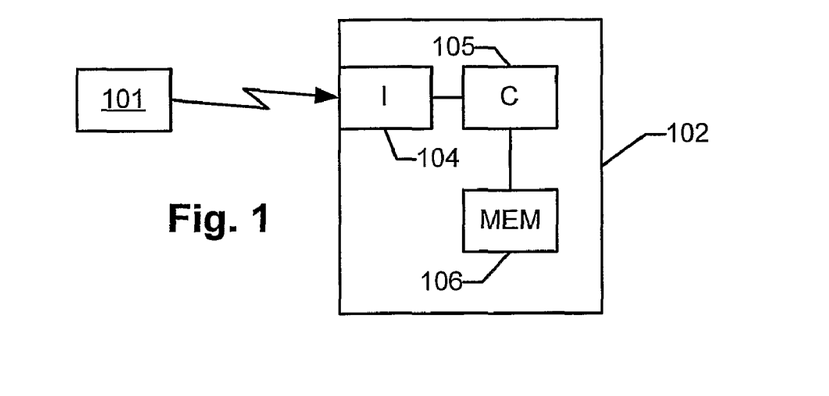
FIG. 1 shows a schematic block diagram of a system for loading data into a mobile terminal.

The above and other aspects will be apparent and elucidated from the embodiments described in the following with reference to the drawing in which:

FIG. 1 shows a schematic block diagram of a system for loading data into a mobile terminal. The system comprises a loading station/update server 101 and a mobile terminal 102.

The loading station may be a conventional, suitably programmed computer, e.g. a PC, comprising a suitable communications interface. In some embodiments, the loading station may generate the payload data, e.g. a software version, configuration data, and/or the like, to be loaded. Furthermore, the loading station may generate a digital signature and certificate to be loaded together with the payload data. In other embodiments, the loading station receives the payload data from a remote computer, e.g. a personal computer, a work station, a network server, etc. For example, the data may be received via a computer network, e.g. the Internet, a local area network, an intranet, an extranet, etc., or by any other suitable means, e.g. on a computer-readable medium such as a floppy disk, a CD ROM, etc. In this embodiment, the calculation of any digital signature(s) and the generation of any certificate(s) may be performed by the remote computer rather than the loading station. The loading station sends the payload data and/or instructions causing the mobile terminal to update its memory contents to the mobile terminal.

The mobile terminal 102 comprises a communications interface 104 that includes circuitry and/or devices suitable for enabling the mobile terminal to receive data from the loading station via a wired or wireless communications link 103, such as a direct data link, a communications network, or the like. For example, the data may be loaded via a local short range wireless communications link, e.g. a Bluetooth connection, an infrared connection, or the like, or via a wired interface. In other embodiments, the data may be loaded into the mobile terminal via a communications network, e.g. over-the-air (OTA) via a cellular telecommunications network, e.g. GSM WCDMA, or the like.

Consequently, examples of suitable communications units include a wired serial connection, such as an RS-232 link, a USB connection, a FireWire connection as described in the IEEE 1394 standard, or the like. Further examples include a wireless infrared interface, or an RF interface, such as the main antenna and receiver of a cellular telephone (not shown), or another receiver within the cellular telephone, such as a Bluetooth transceiver, or the like. Other examples of suitable interfaces include a cable modem, a telephone modem, an Integrated Services Digital Network (ISDN) adapter, a Digital Subscriber Line (DSL) adapter, a satellite transceiver, an Ethernet adapter, or the like.

The mobile terminal further comprises a processing unit 105 for controlling the operation of the mobile terminal, and a memory 106. For example, the processing unit may comprise a general- or special-purpose programmable microprocessor, a Digital Signal Processor (DSP), an Application Specific Integrated Circuit (ASIC), an Programmable Logic Array (PLA), a Field Programmable Gate Array (FPGA), etc., or a combination thereof. In one embodiment, the memory 106 is a flash memory. However, the update process described herein may also be applied to other types of memory, such as an EPROM, an EEPROM, or any other type of memory or storage device, such as a non-volatile memory.

When data is loaded into the mobile terminal, the processing unit 105 performs the data authentication and integrity protection described herein and stores the data in the memory 106.

During subsequent operation of the mobile terminal, the processing unit can retrieve the loaded data from the memory 106. For example, in the case of software, the processing unit loads the software from the memory 106 in a RAM for execution.

In many mobile terminals it is desirable to protect basic phone functionality, including SIM lock, privacy, etc., from unauthorised reprogramming. This can be achieved by integrity protecting the whole or part of the software image of the mobile terminal with a MAC. The MAC may be checked at each start-up of the mobile terminal. When software is flashed into the flash memory of the mobile terminal, the entire software image (or the part of the software image to be protected) is signed during the loading process, and a chip unique MAC is stored in the mobile terminal, e.g. by determining the MAC based on the digital signature of the received software.

In a delta-update scenario, the loading station 101 creates a delta-file and transfers the delta-file to the mobile terminal 102, e.g. OTA. In one embodiment, the delta-file is created by performing a byte-by-byte comparison of a current or so-called baseline version of the software and the new/updated version of the software. The differences between the two versions are stored in the delta-file. Furthermore, the delta-file may include instructions that enable the mobile terminal to generate the new version from the baseline version stored in the mobile terminal and the differences received in the update file. In order to protect the delta-file from modification during transfer from the loading station to the mobile terminal, the loading station 101 may further calculate a digital signature or a message authentication code of the delta file or of the new software image that results from applying the delta-file by the mobile terminal.

Alternatively, when a new software application is to be added to the current software image of the mobile terminal, the whole new software may be transmitted, e.g. OTA, to the mobile terminal. As described above, the new software application may be digitally signed or protected by a MAC.

If the entire software image of the mobile terminal was integrity protected at storage by a MAC, or if an integrity protected part of the software image is updated, the MAC of the integrity protected software image needs to be updated as well. If the entire integrity protected software image is replaced, the calculation of the MAC may be performed as for the initial load of the software. However, if the loading station 101—or the entity that generates the update package which is transferred to the mobile terminal—only knows a part of the current integrity protected memory content of the mobile terminal, the loading station cannot provide a signature of the entire updated software image. In the following, an embodiment of an update process is described, wherein the mobile terminal calculates the new MAC of the updated software image in a robust and secure manner.

Figure 2:
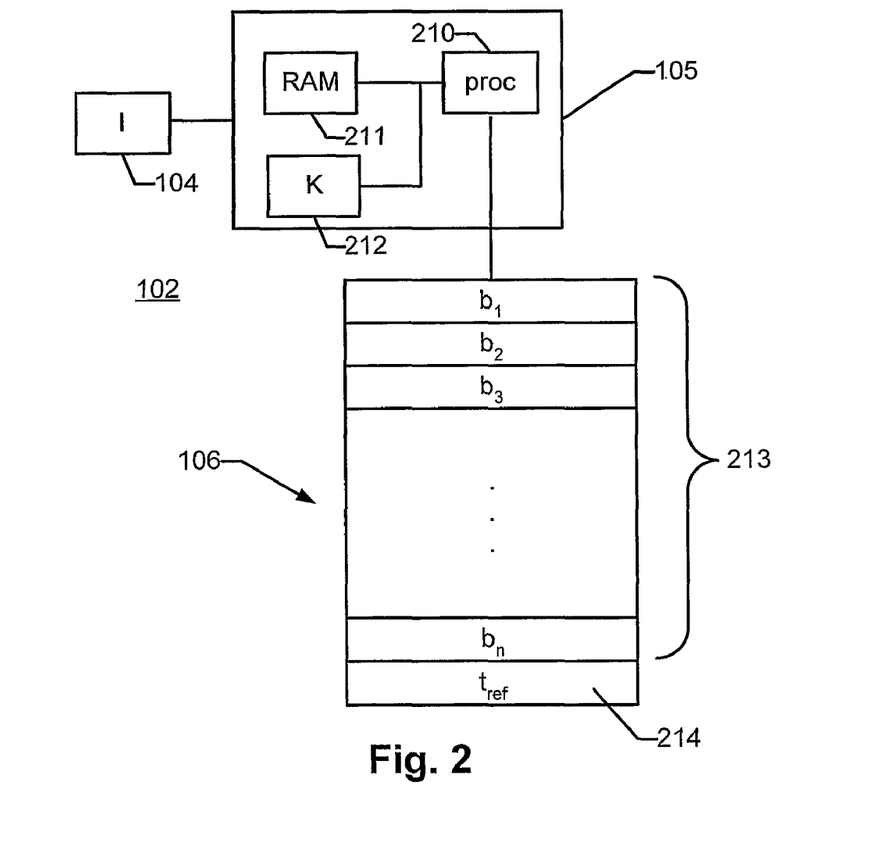
FIG. 2 shows a schematic block diagram of an embodiment of a processing device.

FIG. 2 shows a more detailed block diagram of an embodiment of a mobile terminal. As already described in connection with FIG. 1, the mobile terminal, generally designated 102, comprises a communications interface 104, a processing unit 105, and a flash memory 106.

The processing unit 105 comprises a processing circuit 210, an internal memory 211, such as a random access memory (RAM), and a protected memory for storing a secret key 212. The processing circuit 210 has reading access to the secret key 212 and read/write access to the internal memory 211 and to the flash memory 106. In one embodiment, the secret key 212 is a chip unique key that cannot be accessed outside the chip of the mobile terminal.

The flash memory 106 is divided into a set of memory blocks. For the purpose of the present description, it is assumed that the flash memory comprises n blocks 213 that are integrity protected as described herein. The memory blocks are denoted $b_i$, $i=1, \ldots, n$. When the memory blocks $b_i$ correspond to the blocks of a flash memory, a particularly simple and efficient implementation is provided, e.g. each memory block may be identical to a block of the flash memory of a plurality of the blocks of the flash memory. In addition to the memory blocks 213, the flash memory 106 further has stored therein one or more MAC values 214 calculated over the memory blocks 213. In the case of several MACs, each MAC may be calculated over a respective subset of the memory blocks 213. It is noted that, in alternative embodiments, the MAC(s) 214 may be stored in a separate memory instead of the memory 106.

At each start-up of the mobile terminal or whenever requested by an application running on the mobile terminal, e.g. by the platform of core software, the MAC (or MACs) of the current memory image of the blocks 213 is calculated by the processing circuit 210 using the secret key 212 as input. Hence, a MAC over all the memory blocks may be written as $t=f(b_1, \ldots, b_n; K)$, where f is the MAC function, K the secret key 212, and t the resulting MAC value, also called the tag value of the MAC.

If the calculated value t corresponds to the reference tag value $t_{ref}$ stored in the memory 106, the mobile terminal continues to function normally; otherwise some or all of the functionality of the mobile terminal are disabled.

Figure 3:
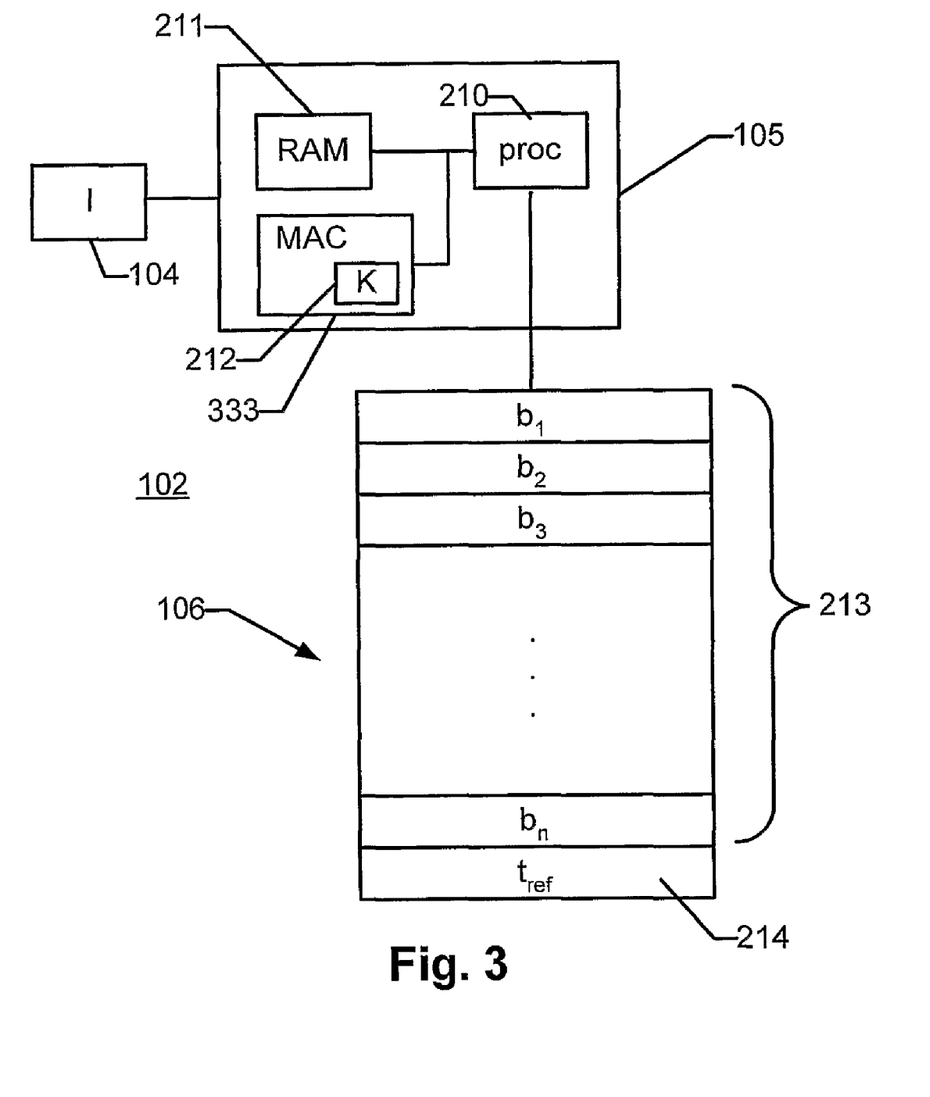
FIG. 3 shows a schematic block diagram of another embodiment of a processing device.

FIG. 3 illustrates an alternative embodiment of a mobile terminal. The mobile terminal 102 of FIG. 3 corresponds to the mobile terminal of FIG. 2. However, in this embodiment, the processing unit 105 comprises a separate MAC calculation module 333. The MAC calculation module comprises the secret key 212. In this embodiment, the processing circuit 210 calls a MAC calculation function of the MAC calculation module 333 and provides the memory blocks $b_i$ for each calculation step to the MAC calculation module. The MAC calculation module returns the calculated MAC value. Hence in this embodiment, the processing circuit 210 does not have direct access to the secret key 212, since access to the key 212 is confined to the MAC calculation module, thereby further increasing the security. The MAC calculation module 333 may provide an implementation of the MAC calculation in software and/or in hardware.

In the following and with reference to FIGS. 2-4, an embodiment of an update process for a part of the memory of a mobile terminal will be described.

FIG. 4 shows a flow diagram of an embodiment of an update process of the memory content of a mobile terminal.

Figure 4A:
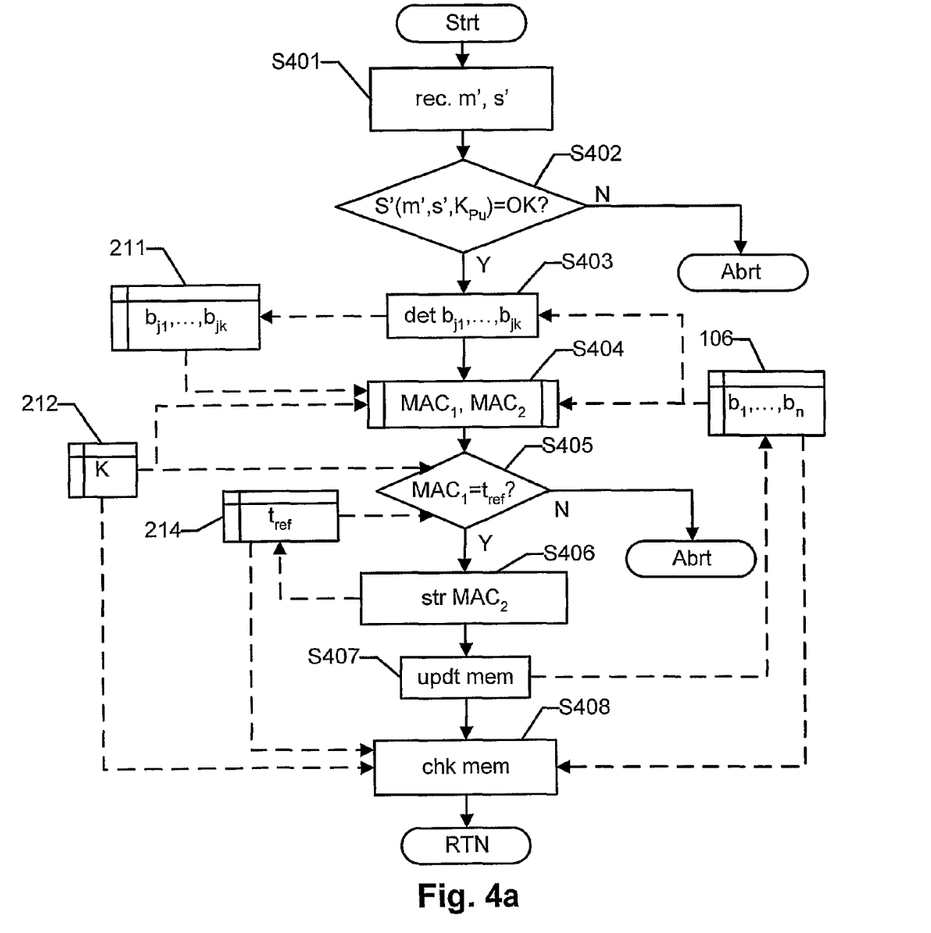
FIG. 4 shows a flow diagram of an embodiment of an update process for updating memory contents of a processing device.

FIG. 4a shows the overall flow diagram of the update process. In initial step S401, the mobile terminal receives an update package from a loading station/update server. The update package comprises payload data, i.e. the actual memory updates, and a digital signature generated by the loading station/update server. Denoting the payload data transmitted by the loading station/update server by m, the loading station/update server generates a digital signature s according to $s=S(m,K_{Pr})$, where S is the signature function and $K_{Pr}$ is a private key of the loading station/update server. The loading station/update server transmits an update package including m and s. In step S401, the mobile terminal receives a corresponding update package comprising the received payload m' and the received signature s'.

In subsequent step S402, the mobile terminal checks the signature s' by applying a Boolean signature checking function S' that takes the received upgrade payload m', the received signature s', and the public key $K_{Pu}$ corresponding to the private key $K_{Pr}$ used by the signature generator as inputs. If the signature checking function S' indicates a successful verification of the signature, the mobile terminal accepts the update package m' as authentic and the process continues at step S403; otherwise the process is aborted, optionally with a corresponding message to the loading station.

In step S403, based on the received update package m' and the current contents of the memory blocks, the mobile terminal identifies which of the memory blocks $b_i$ of the flash memory block will be changed or added by the update. For the purpose of the present description it is assumed that k memory blocks need to be changed/added (k≦n), These blocks will be denoted by $b'_{j1}, b'_{j2}, \ldots, b'_{jk}$, where $j_i \in \{1, \ldots, n\}$ for all $i=1, \ldots, k$. The mobile terminal extracts the updated contents of the identified blocks from the update package and stores the new contents of the identified blocks in a suitable trusted internal phone memory 211, e.g. internal RAM.

In an alternative embodiment, the digital signature that is calculated in step S401 and verified in step S402 is calculated over the blocks $b'_{j1}, b'_{j2}, \ldots, b'_{jk}$ that result from the update rather than over the message m, thereby further increasing the security of the update process. Consequently, in this alternative embodiment, the verification of the signature (step S402) is performed once these blocks have been calculated, i.e. after step S403.

In step S404, the mobile terminal performs a parallel calculation of two MACs: A first MAC, denoted $MAC_1$, is calculated over the current flash memory blocks $b_1, \ldots, b_n$ stored in the flash memory 106; and second MAC, denoted $MAC_2$, is calculated over the current contents of those memory blocks stored in memory 106 that will not be changed during the update, and over the contents of the identified new memory blocks stored in the internal memory 211. Hence both MACs are calculated over the entire memory image, i.e. over the current image and over the new image as it will be after the update. The second MAC is calculated over a virtual build of blocks from both the memory 106 and from the internal memory 211, i.e. before the complete updated memory image is generated. Embodiments of a parallel process for calculating the two MACs will be described in greater detail below. Both MAC calculations further receive a chip unique secret key K, designated 212, as an input.

In step S405, the mobile terminal compares the calculated first MAC ($MAC_1$) with the reference MAC value, denoted $t_{ref}$ stored in memory 214 of the mobile terminal. If the MAC values agree, the process continues at step S406; otherwise the process is aborted.

In step S406, the mobile terminal replaces the current reference MAC value $t_{ref}$ in memory 214 with the second MAC value $MAC_2$.

In subsequent step S407, the mobile terminal performs the software update according to the received upgrade package. This is performed in such a way that even if the mobile terminal is switched off during the update, it is possible for the mobile terminal to continue the update from the step it has reached before it was switched off. For example, this may be achieved by applying a robust delta-upgrade process. In one embodiment, state information of the update process, e.g. an update agent that performs the software update, is stored into a predetermined area of the flash memory each time a new block is flashed into memory, i.e. just before each flash operation. The area of the flash memory into which state information is stored will be referred to as state memory or working directory. The state information includes the current contents of the memory block before the flash operation. Once the new block has actually been flashed into memory, the state memory is updated and a state counter is incremented to indicate which step in the update process has been reached. Hence, if the update process is aborted and subsequently restarted, the update process reads the contents of the state memory and continues the update process from where it was interrupted. For example, if the process was interrupted during a flash operation of a block, the process repeats the entire flash operation of that block.

In some embodiments, the update process involves a reboot of the mobile terminal.

In step S408 the mobile terminal performs an integrity check of the updated contents of the memory 106 based on the newly stored reference MAC: $t_{ref}$=$MAC_2$. The integrity check function calculates the MAC over the contents of memory 106 using the secret key K, and compares the result with $t_{ref}$. In some embodiments, step 408 is performed at the next start-up of the mobile terminal.

Hence, in the above described update process, an attempt by a dishonest user to interrupt the update process before or after the re-write (re-flash) of the memory and to replace the authentic memory contents by an unauthorised memory content would be detected during this verification in step S408 and or by the verification of the original MAC in step S405.

In some embodiments, the program code that is responsible for the software update—or at least the security critical steps of the update process—is trusted program code, such as firmware, integrity protected code, or the like, thereby ensuring that the software performing the update steps in the mobile terminal work correctly and have not been tampered with. Hence, in such an embodiment at least steps S402, S403, S404, S405, S406, and S408 are performed by trusted program code.

Figure 4B:
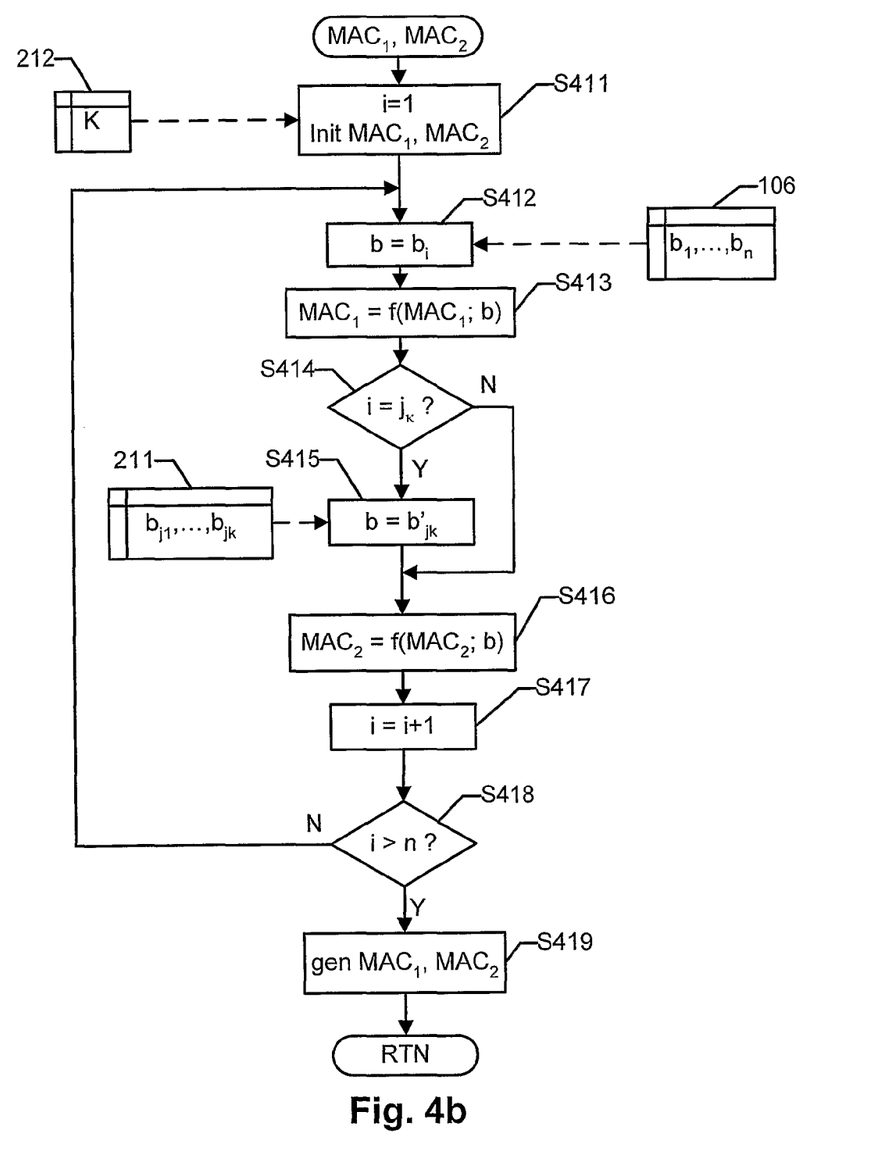

FIG. 4b shows a flow diagram of an embodiment of the parallel calculation of two message authentication codes. The parallel calculation of the two MACs $MAC_1$ and $MAC_2$ of step S404 starts by an initialisation step S411, in which two state machines $MAC_1$ and $MAC_2$ for the respective MACs are initialised. The initialisation step depends on the secret key K and, optionally, on a number of initialisation parameters. Furthermore, a block counter i is initialised to point to the first memory block $b_1$ of the memory blocks over which the MACs are to be calculated. After initialisation, the process continues at step S412.

In step 412, the process retrieves the current value of the memory block $b_i$ referenced by the counter i from the flash memory 106 and stores the memory block in an internal register b.

In subsequent step S413, the process updates the state machine $MAC_1$ based on the content of the register b, i.e. based on the current content of block $b_i$.

In subsequent step S414, the process determines whether the block $b_i$ is one of the previously identified blocks that will be changed by the update, i.e. whether $i=j_\kappa$ for any $\kappa \in \{1, \ldots, k\}$, where the $j_\kappa$ are the indices of the identified memory blocks that will be changed. If the current block is one of the identified blocks, the process continues at step S415; otherwise the process continues at step S416.

In step S415, the process replaces the register value b by the corresponding new memory block contents $b'_{j_\kappa}$ of the identified memory block previously stored in internal memory 211. The process then proceeds at step S416.

In step S416, the process updates the state machine $MAC_2$ based on the content of the register b, i.e. based on either the current content of block $b_i$ or the updated content $b'_{j_\kappa}$. It is noted, that the update of both state machines $MAC_1$ and $MAC_2$ is performed based on a single memory readout operation of the current block $b_i$ from memory 106. Consequently, it is ensured that both MACs are based on the same current memory content.

In subsequent step S417, the counter i is incremented to point to the subsequent memory block $b_{i+1}$.

In step S418 it is tested whether all memory blocks have been processed. If yes, the process proceeds at step S419; otherwise the process returns to step S412 to process the next memory block.

In step S419, the calculation of the two MAC values $MAC_1$ and $MAC_2$ are finalised, and the process returns to the overall update process.

Figure 5:
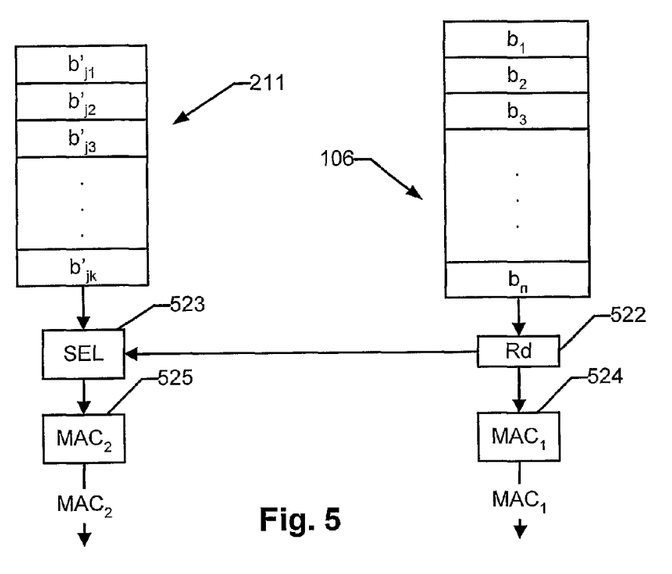
FIG. 5 shows a functional block diagram of an embodiment of a process for calculating first and second MACs.

FIG. 5 shows a functional block diagram of an embodiment of a calculation process for calculating first and second MACs. The calculation of the two message authentication codes $MAC_1$ and $MAC_2$ is performed by respective message authentication code calculation modules 524 and 525. The module 524 receives the memory blocks 213 stored in the flash memory 106 and generates the message calculation code $MAC_1$ over the current contents of the memory 106. To this end, the calculation process includes a memory read module 522 that reads the memory blocks from memory 106 in a predetermined sequence, e.g. one memory block at a time, and feeds each read memory block to both the message authentication code calculation module 524 and a selector module 523. Hence, in this embodiment, the memory block received by the selector module and the MAC calculation module 524 originate from the same read operation of the flash memory, thereby increasing the security against unauthorised tampering with the memory between the two calculations.

The selector module 523 receives the memory blocks form the read module 522 and further reads the memory blocks $b'_{j1}, \ldots, b'_{jk}$ from the internal memory 211 described above. For each memory block received from the read module 522, the selector module 523 determines whether an updated version of that memory block is present in the internal memory 211. If there is such an updated version, the selector module 523 feeds the updated memory block to the MAC calculation module 525; otherwise the selector module feeds the current memory block received from the read module 522 to the MAC calculation module 525. The MAC calculation module 525 thus calculates the message authentication code $MAC_2$ over a virtual image of the memory 106, i.e. the memory image as it will be after the memory update.

Figure 6:
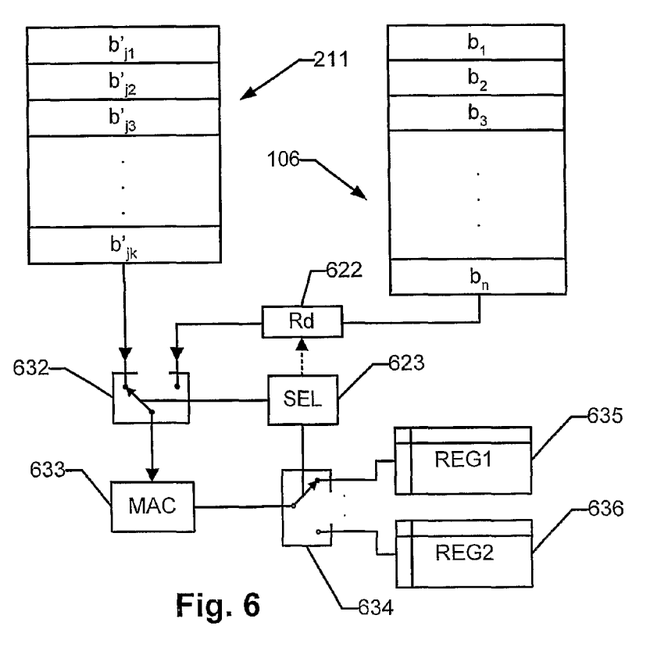
FIG. 6 shows a functional block diagram of another embodiment of a process for calculating first and second MACs.

FIG. 6 shows a functional block diagram of another embodiment of a calculation process for calculating first and second MACs. This embodiment comprises only one MAC calculation module compared to the two MAC calculation modules of FIG. 5. The MAC calculation module 633 performs an iterative MAC calculation process where each iteration involves the processing of one of the memory blocks over which the MAC is to be calculated. In each iteration, a set of internal state variables is updated based on the processing of the memory block.

The embodiment of FIG. 6 comprises two sets of registers 635 and 636, each adapted to store a set of internal state variables of the MAC calculation module 633. Hence, during operation, the process initialises the state variables of each of the registers 635 and 636. Subsequently, the MAC calculation module 633 is controlled by a selector module 623 to perform a series of iterations. At each iteration, the MAC calculation module 633 receives a current memory block from the flash memory 106 or an updated block from the internal memory 211. The MAC calculation module processes the received memory block and updates one of the registers 635 and 636. To this end, the selector module controls two switches 632 and 634. The selector module controls the switch 634 such that at every other iteration of the MAC calculation module, the register 635 is updated, and at the remaining iterations the register 636 is updated. Furthermore, the selector module 623 controls the switch 632 such that at the iterations during which the register 635 is updated the MAC calculation module receives a corresponding memory block from the flash memory 106. At the iterations during which register 636 is updated the selector module 623 controls the switch 632 such that the MAC calculation circuit receives a current memory block from flash memory 106 or the corresponding updated memory block from internal memory 211, depending on whether the corresponding memory block remains unchanged during the update or not. In one embodiment, the process further comprises read module 622 that reads out a sequence of memory blocks from the flash memory 106 and feeds them into the switch 632. The read module is controlled by the selector unit to perform a read operation at every other iteration, thereby ensuring that the same memory block contents are fed into both MAC calculations.

In one embodiment, the process described in connection with FIG. 6 is implemented in hardware, thereby providing a high level of security and a high calculation performance. In one embodiment, the MAC is a block cipher or a one-way hash function for which fast hardware implementations are known. An example of a hardware implementation of a MAC is described in "VLSI implementation of the keyed-hash message authentication code for the wireless application protocol" by G. Selimis et al., Proc. of the $10^{th}$ IEEE Internat. Conf. on Electronics, Circuits and Systems (ICECS'03), United Arab Emirates, Dec. 14-17, 2003.

Hence, in an embodiment of such a hardware implementation, the MAC calculation is started by an initialisation that depends on the secret key K and optionally on an initialisation vector. The initialisation results in initial values of a set of state variables. During the subsequent MAC calculation some or all of the state variables are updated for each memory block that is processed. A parallel calculation of two MACs as described herein without duplication of the MAC hardware can be provided by the embodiment of FIG. 6. Accordingly, only the internal registers for storing the MAC state variables are duplicated and every second call to the hardware block either causes a MAC update of the first or the second set of registers.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. It is understood, however, that the method, product means, and device described herein may also be applied to other data processing devices.

Furthermore, the embodiments have mainly been described with reference to situations where a single MAC protects the entire memory image. However, it will be appreciated that the method described herein can also be applied to situations where different MACs protect different parts of the data stored in memory.

Furthermore, the embodiments have mainly been described with reference to the loading of a software image. However, it will be appreciated that the method described herein can also be applied to situations where other types of memory content are updated.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of updating at least a part of a memory content stored in a memory of a processing device, the memory comprising a plurality of addressable memory blocks, the memory content being protected by a current integrity protection data item stored in the processing device, the method comprising the steps of:
    determining a first subset of said plurality of memory blocks that require an update from respective current memory block contents to respective updated memory block contents, and a second subset of the plurality of memory blocks having stored therein respective current memory contents that remain unchanged by said updating;
    calculating a first and a second integrity protection data item over the plurality of memory blocks; wherein the first integrity protection data item is calculated over the current memory contents of the first and second subsets of memory blocks; wherein the second integrity protection data item is calculated over the current memory contents of the second subset of memory blocks and the updated memory block contents of the first subset of memory blocks; and wherein calculating the first and the second integrity protection data items is performed as parallel processes; and
    updating said first subset of memory blocks with said respective updated memory block contents and storing said first subset of memory blocks to the memory.

2. The method according to claim 1, further comprising the steps of:
    comparing the first integrity protection data item with the current integrity protection data item;
    if the first integrity protection data item and the current integrity protection data item correspond to each other, storing the second integrity protection data item and updating the first subset of memory blocks with the respective updated memory block contents; and
    performing an integrity check of the updated memory content based on the stored second integrity protection data item.

3. The method according to claim 2, wherein performing the integrity check further comprises the steps of:
    calculating an audit integrity protection data item of the updated memory after updating the first subset of memory blocks with the respective updated memory block contents; and
    comparing the calculated audit integrity protection data item with the stored second integrity protection data item.

4. The method according to claim 1, wherein calculating the first and the second integrity protection data items as parallel processes includes the further step of initiating calculating the first and the second integrity protection data items prior to completing calculation of any one of the first and second integrity protection data items.

5. The method according to claim 1, wherein calculating each of the first and second integrity protection data items further comprises the step of performing a corresponding iterative process including a number of iterations; wherein each iteration includes processing one or more of said plurality of memory blocks; and wherein each iteration is performed for the calculation of the first and the second integrity protection data items prior to processing a subsequent iteration.

6. The method according to claim 1, wherein calculating the first and the second integrity protection data items as parallel processes includes sequentially processing the plurality of memory blocks such that each memory block is processed for the calculation of the first and the second integrity protection data items prior to processing a subsequent memory block.

7. The method according to claim 1, further comprising the steps of:
obtaining the current memory block content of a first memory block;
processing the obtained current memory block content for the calculation of the first integrity protection data item;
if the first subset of memory blocks includes the first memory block, then obtaining and processing the updated memory content of the first memory block for the calculation of the second integrity protection data item, otherwise processing the obtained current memory block content of the first memory block for the calculation of the second integrity protection data item; and
performing each of the foregoing obtaining steps and processing steps for all memory blocks.

8. The method according to claim 1, wherein the processing device is a mobile terminal.

9. The method according to claim 1, wherein the memory is a flash memory.

10. The method according to claim 1, further comprising the step of receiving a data item comprising said updated memory block contents.

11. The method according to claim 10, wherein the step of receiving the data item further comprises the step of verifying the data item by applying a cryptographic authentication process.

12. The method according to claim 10, wherein the data item comprises a delta-update package.

13. The method according to claim 10, wherein the step of receiving the data item further comprises the step of receiving a digital signature calculated over the updated memory blocks; and wherein determining a first subset of said plurality of memory blocks that require an update further comprises verifying the digital signature of the updated memory blocks.

14. The method according to claim 1, wherein the integrity protection data item is a message authentication code.

15. The method according to claim 14, wherein the step of calculating the first and second integrity protection data item is performed by a hardware implementation of a message authentication code.

16. The method according to claim 14, wherein the step of calculating the first and second integrity protection data items further comprises the steps of:
providing a message authentication calculation module adapted to implement an iterative message authentication code calculation process including a sequence of iterations, wherein each iteration includes updating a set of state variables;
providing first and second sets of registers for storing respective first and second sets of state variables; and
causing the message authentication calculation module to alternately perform iterations of the calculation of the first and second integrity protection data item and to alternately update the first and second sets of registers.

17. A processing device configured to perform an update of at least a part of a memory content stored in a memory, the memory having a plurality of addressable memory blocks, the memory content being protected by a current integrity protection data item stored in the processing device, the processing device further comprising:
means for determining a first subset of said plurality of memory blocks that require an update from respective current memory block contents to respective updated memory block contents, and a second subset of the plurality of memory blocks having stored therein respective current memory contents that remain unchanged by said updating;
means for calculating a first and a second integrity protection data item over the plurality of memory blocks; wherein the first integrity protection data item is calculated over the current memory contents of the first and second subsets of memory blocks; wherein the second integrity protection data item is calculated over the current memory contents of the second subset of memory blocks and the updated memory block contents of the first subset of memory blocks; and wherein calculating the first and the second integrity protection data items is performed as parallel processes; and
means for updating said first subset of memory blocks with said respective updated memory block contents and means for storing said first subset of memory blocks to the memory.

18. The processing device according to claim 17, wherein the processing device includes said memory.

19. The processing device according to claim 17, wherein the processing device is a mobile terminal.

20. The processing device according to claim 17, wherein the memory is a flash memory.

21. The processing device according to claim 17, further comprising means for receiving a data item comprising said updated memory block contents.

22. The processing device according to claim 21, wherein said data item is protected by a digital signature; and wherein the processing device is further adapted to verify said digital signature.

23. The processing device according to claim 17, wherein the processing device comprises a hardware module for implementation of a message authentication code.

24. The processing device according to claim 17, wherein the processing device comprises:
a message authentication calculation module adapted to implement an iterative message authentication code calculation process including a sequence of iterations, wherein each iteration includes updating a set of state variables;
first and second sets of registers for storing respective first and second sets of state variables; and
wherein the processing device is adapted to cause the message authentication calculation module to alternately perform iterations of the calculation of the first and second integrity protection data item and to alternately update the first and second sets of registers.

25. A computer program product comprising:
program code stored on a non-statutory non-transitory computer readable medium adapted to be loaded into and executed by a microprocessor, wherein the program code is adapted to:
determine a first subset of said plurality of memory blocks that require an update from respective current memory block contents to respective updated memory block contents, and a second subset of the plurality of memory blocks having stored therein respective current memory contents that remain unchanged by said updating;

calculate a first and a second integrity protection data item over the plurality of memory blocks; wherein the first integrity protection data item is calculated over the current memory contents of the first and second subsets of memory blocks; wherein the second integrity protection data item is calculated over the current memory contents of the second subset of memory blocks and the updated memory block contents of the first subset of memory blocks; and wherein calculating the first and the second integrity protection data items is performed as parallel processes; and update said first subset of memory blocks with said respective updated memory block contents and storing said first subset of memory blocks to the memory.

* * * * *

UNITED STATES PATENT AND TRADEMARK OFFICE
CERTIFICATE OF CORRECTION

Page 1 of 2

| PATENT NO. | : 8,015,378 B2 |
|---|---|
| APPLICATION NO. | : 11/813480 |
| DATED | : September 6, 2011 |
| INVENTOR(S) | : Gehrmann |

It is certified that error appears in the above-identified patent and that said Letters Patent is hereby corrected as shown below:

In Fig. 1, Sheet 1 of 5, insert Reference Tag -- 103 -- at an appropriate place.

Signed and Sealed this
Twentieth Day of March, 2012

David J. Kappos
*Director of the United States Patent and Trademark Office*

Fig. 1

Fig. 2